Oct. 29, 1963 MIYOSHI KITO ETAL 3,108,345
WIRE GRIPPER
Filed June 1, 1961
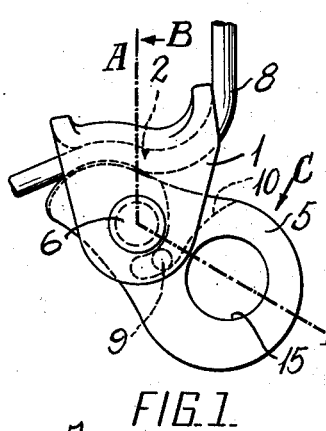
FIG.1.
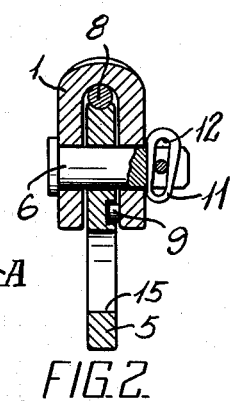
FIG.2.
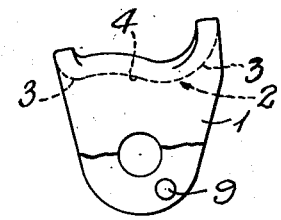
FIG.3.
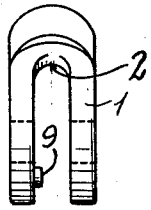
FIG.4.
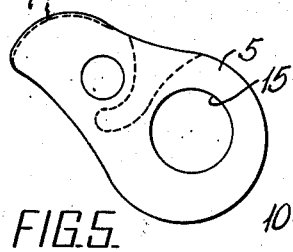
FIG.5.
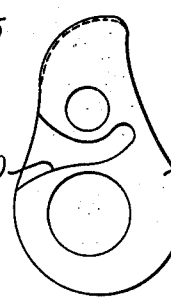
FIG.6. FIG.7.
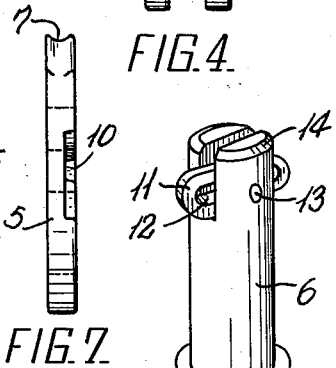
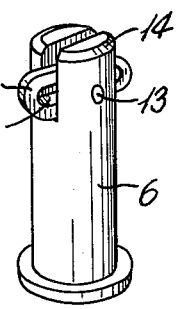
FIG.8.
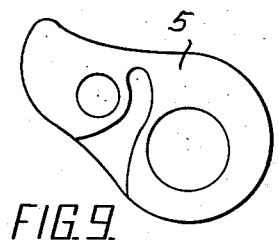
FIG.9.
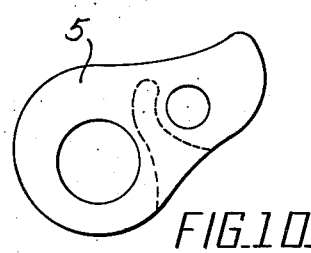
FIG.10.
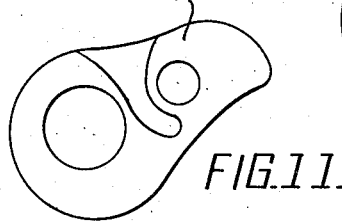
FIG.11.
INVENTORS
MIYOSHI KITO
RYOICHI YAMAMOTO
BY McGlew and Toren
ATTORNEYS – # United States Patent Office 3,108,345
Patented Oct. 29, 1963

3,108,345
WIRE GRIPPER
Miyoshi Kito, 745 Seijyomachi, Setagaya-ku, Tokyo, Japan, and Ryoichi Yamamoto, 742 Kaminunoda, Kawasaki-shi, Kanagawa-ken, Japan
Filed June 1, 1961, Ser. No. 114,083
Claims priority, application Japan Dec. 12, 1960
4 Claims. (Cl. 24—134)

The present invention relates to a wire gripper for hoists or other loading apparatus, comprising a gripper proper with two parallel cheeks, a cam member inserted pivotally between said cheeks of said gripper proper, and a pivot for interconnecting said proper and member.

In case of using a wire gripper of this kind, one must insert the free end of a wire into a space between the gripper proper and the cam member of an assembled wire gripper and then draw out the wire by gripping by hand its free end having passed through said space, or one must assemble the gripper proper and the cam member of a dismantled wire gripper by mounting them on a place of a wire where it is to be gripped between said proper and member. In the former case it takes much time to insert and draw out the free end of the wire, while in the latter case the gripper proper and the cam member can be assembled wrongly in such a manner that the wire can slip in the gripper, with the result that an eventual serious accident can occur.

In order to avoid the difficulties mentioned above, the present invention has its object to assure always a wire gripper of its correct assemblage, that is, to assure that one can assemble in no wise the gripper proper and the cam member into a wire gripper wrongly. According to this invention this object is attained by that the gripper proper is provided on the inside of one of its cheeks with a projection, while the cam member is provided with a guide groove for receiving said member, extending from a portion of its periphery edge to a portion of its body substantially concentrically to its pivot hole, so that said projection can enter the groove from said portion of the periphery edge in only one direction about the pivot.

In the accompanying drawing
FIG. 1 is a front elevation of a wire gripper embodying this invention,
FIG. 2 is a sectional side elevation along line A—A in FIG. 1, seen in the direction of the arrow B,
FIG. 3 is a front elevation of the gripper proper, partly, cut away,
FIG. 4 is a side elevation of the same,
FIG. 5 is a front elevation of the cam member of the gripper,
FIG. 6 is a rear elevation of the same,
FIG. 7 is a side elevation of the cam member shown in FIG. 6,
FIG. 8 is an enlarged perspective view of a pivot used in the gripper shown in FIG. 2,
FIGS. 9, 10 and 11 show front elevations of the cam member which is situated in incorrect positions, assuming that FIG. 5 shows the member is situated in the correct position for being assembled into the gripper.

Referring to FIGS. 1–5, the gripper proper 1 of a wire gripper is provided with two parallel cheeks, between which it is provided with a wire guide groove 2 of a contour comprising substantially a convexly arcuate inlet and outlet portions 3 and a concavely arcuate intermediate gripping portion 4. The cam member 5 of the wire gripper to be assembled together with the gripper proper 1 by a pivot 6 is provided on its periphery with a convexly arcuate gripping portion 7, between which and the gripping portion 4 of the gripper proper 1 a wire 8 is to be gripped fast, as shown in FIG. 1. As the longitudinal center line of the curved face of the portion 4 of the gripper portion 1 is made parallel to that of the portion 7 of the member 5, in case of the wire 8 being gripped by the gripper, as shown in FIG. 1, the wire can be in surface contact with both the gripper proper and the cam member, so that the wire can not be subjected to any undesirable local load which would occur if the wire be in line or point contact with both or either of the gripper proper 1 and the cam member 5.

The gripper proper 1 is provided on the inside of one of its cheeks with a projection 9, while the cam member 5 is provided with a guide groove 10 for receiving said projection 9. This groove extends from a portion of the periphery edge of the member to a portion of the body of the member 5, so that in case of assembling the member and the proper the projection 9 can enter the groove 10 from said portion of the periphery edge of the member only in one direction about the pivot 6. Practically, for facilitating entrance of the projection 9 into the groove 10, it is preferable that the groove 10 has a profile of an approximately triangle, whose one side is formed by the above mentioned portion of the cam member periphery edge, as shown in FIG. 6. Thus, in case of assembling the gripper proper 1 and the cam member 5, one mounts them onto a place of the wire 1 where the wire is to be gripped, in such a manner that the projection 9 can enter the groove 10 in the direction shown by the arrow C in FIG. 1. If the cam member 5 which is situated in any of incorrect positions shown in FIGS. 9, 10 and 11, be inserted between the cheeks of the gripper proper 1, then the projection 9 of the gripper proper 1 prevents the cam member 5 from being rotated about the pivot 6, so that the wire can not be gripped between the gripper proper and the cam member 5.

The pivot 6 which is to be inserted detachably into the pivot holes of both the gripper proper 1 and the cam member 5 can be secured to the gripper proper 1 by a split pin or a nut. However, the pivot 6 can be provided with a loop wedge 11 into whose slot 12 is inserted a pin 13 fixed, e.g. caulked to the forked end 14 of the pivot 6. In case of dismantling the wire gripper, one moves the loop wedge 11 along its slot 12 perpendicularly to the pivot axis till the slot end on the narrow side of the loop wedge 11 reaches the pin 13, and then rotates the wedge 11 to be in the axial direction of the pivot 6, whereupon one can remove the pivot 6 from the gripper.

A hook or shackle carrying a load can be engaged into a hole 15 in the cam member 5 of the gripper.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A wire gripper comprising a substantially U-shaped gripper member having a curved top wall and side cheeks between which wire is adapted to be fed, a pivot pin extending through said side cheeks, a cam member rotatably mounted on said pivot pin and having a curved portion extending outwardly from said pivot and complementarily shaped in respect to one side only of said top wall and adapted to bear against a wire which will be positioned between said cheeks and against said top wall, said cam member also having a bottom portion adapted to be disposed on an opposite side of said gripper member from said curved portion, a groove defined on said cam member extending from the periphery inwardly in a curve at least partially substantially concentric with said pivot pin, and a projection formed on said gripper cheek extending into said groove and permitting pivotal movement of said camming member, said groove and said projection being formed to permit orientation of said camming member with said gripper from one side only in which said camming surface is in an operative position in relation to said top wall.

2. A wire gripper according to claim 1, wherein said camming member includes a ring portion opposite said camming surface having an outer periphery located further from said pivot than said camming surface.

3. A wire gripper according to claim 1, wherein said pivot pin is removably secured to said gripper.

4. A wire gripper comprising a substantially U-shaped member having a top curved bridging portion and side cheeks between which wire is adapted to be fed, a cam member pivotally connected to said gripper member between said side cheeks and having a camming surface extending outwardly from said pivotal location and complementarily shaped in respect to one side only of said bridging portion and disposed to bear against wire held by said bridging portion and between said side cheeks when said cam member is pivoted to said gripper in a properly oriented manner, and cooperable projecting pin and groove means including a pin on one side of the gripper member and a groove adapted to receive the pin defined on the corresponding side of said cam member extending inwardly from the periphery thereof and having a portion concentric to said pivotal connection to permit pivotal movement of said cam when the pin is in the groove, said groove and said projection being formed to permit orientation of said camming member with said gripper from one side only in which said camming surface is in an operative position in relation to said bridging portion.

References Cited in the file of this patent
UNITED STATES PATENTS

| | | |
|---|---|---|
| 152,635 | Hewitt | June 30, 1874 |
| 1,313,669 | Brooks | Aug. 19, 1919 |
| 1,438,261 | Raney | Dec. 12, 1922 |
| 1,496,568 | Vanderdonck | June 3, 1924 |
| 2,611,638 | Meighan | Sept. 23, 1952 |

FOREIGN PATENTS

| | | |
|---|---|---|
| 449 | Great Britain | Jan. 9, 1894 |
| 4,857 | Great Britain | 1915 |